United States Patent
Bahlenberg et al.

(10) Patent No.: US 12,535,550 B2
(45) Date of Patent: Jan. 27, 2026

(54) POSITIONING SYSTEM, COMPUTER-IMPLEMENTED POSITIONING METHOD, COMPUTER PROGRAM AND NON-VOLATILE DATA CARRIER

(71) Applicant: DELAVAL HOLDING AB, Tumba (SE)

(72) Inventors: Peter Bahlenberg, Tumba (SE); Göran Eriksson, Tumba (SE); Anders Umegård, Tumba (SE)

(73) Assignee: DeLaval Holding AB, Tumba (SE)

( * ) Notice: Subject to any disclaimer, the term of this patent is extended or adjusted under 35 U.S.C. 154(b) by 275 days.

(21) Appl. No.: 18/566,848

(22) PCT Filed: Jun. 2, 2022

(86) PCT No.: PCT/SE2022/050541
§ 371 (c)(1),
(2) Date: Dec. 4, 2023

(87) PCT Pub. No.: WO2022/260576
PCT Pub. Date: Dec. 15, 2022

(65) Prior Publication Data
US 2024/0201307 A1   Jun. 20, 2024

(30) Foreign Application Priority Data
Jun. 10, 2021   (SE) .................... 2150732-2

(51) Int. Cl.
*G01S 5/02* (2010.01)
*A01K 11/00* (2006.01)

(52) U.S. Cl.
CPC ............ *G01S 5/021* (2013.01); *A01K 11/006* (2013.01); *G01S 5/02213* (2020.05); *G01S 5/0294* (2013.01); *G01S 2205/01* (2020.05)

(58) Field of Classification Search
CPC .......................... G01S 5/02213; G01S 5/0294
(Continued)

(56) References Cited

U.S. PATENT DOCUMENTS

| | | |
|---|---|---|
| 2009/0066568 A1 | 3/2009 | Britz et al. |
| 2015/0237833 A1 | 8/2015 | Florczak |

(Continued)

FOREIGN PATENT DOCUMENTS

| | | | |
|---|---|---|---|
| AT | 506628 A1 | 10/2009 | |
| WO | 2006022548 A1 | 3/2006 | |

(Continued)

OTHER PUBLICATIONS

Search Report for SE Application No. 2150732-2 mailed Feb. 11, 2022, 3 pages.

(Continued)

*Primary Examiner* — Harry K Liu
(74) *Attorney, Agent, or Firm* — NIXON & VANDERHYE

(57) ABSTRACT

A positioning system has a central unit receiving identity and timing information; and based thereon determines a respective position in an area of each of a set of entities. Each entity carries a mobile unit repeatedly transmitting a radio message including the identity information. The positioning system also contains at least three base stations, each receiving the radio messages from the mobile units; and based thereon, forwards the identity and timing information to the central unit. During a measurement period, the central unit registers positions of the entities as a trace for each mobile unit. The central unit checks whether, during the measurement period a first predefined number of traces are interrupted during a first threshold interval, and the predefined number of traces are interrupted in a first zone, (Continued)

which exceeds a first threshold size. If so, a capacity alarm with respect to the first zone is generated.

13 Claims, 3 Drawing Sheets

(58) Field of Classification Search
USPC .......................................................... 342/451
See application file for complete search history.

(56) References Cited

U.S. PATENT DOCUMENTS

| | | |
|---|---|---|
| 2015/0293205 A1 | 10/2015 | Sloth et al. |
| 2019/0380311 A1 | 12/2019 | Crouthamel et al. |
| 2020/0309895 A1* | 10/2020 | Wu ........................ G01S 13/878 |
| 2021/0072029 A1 | 3/2021 | Marques et al. |
| 2021/0165977 A1 | 6/2021 | Cheng et al. |

FOREIGN PATENT DOCUMENTS

| | | | |
|---|---|---|---|
| WO | 2017031111 A1 | 2/2017 | |
| WO | 2019226103 A1 | 11/2019 | |
| WO | WO-2021227791 A1 * | 11/2021 | ............ G01J 5/0003 |

OTHER PUBLICATIONS

International Search Report for PCT/SE2022/050541 mailed Sep. 16, 2022, 3 pages.
Written Opinion of the ISA for PCT/SE2022/050541 mailed Sep. 16, 2022, 8 pages.

* cited by examiner

POSITIONING SYSTEM, COMPUTER-IMPLEMENTED POSITIONING METHOD, COMPUTER PROGRAM AND NON-VOLATILE DATA CARRIER

CROSS-REFERENCE TO RELATED APPLICATIONS

This application is the U.S. national phase of International Application No. PCT/SE2022/050541 filed Jun. 2, 2022 which designated the U.S. and claims priority to SE 2150732-2 filed Jun. 10, 2021, the entire contents of each of which are hereby incorporated by reference.

TECHNICAL FIELD

The present invention relates generally to positioning of mobile entities. Especially, the invention relates to a system according to the preamble of claim 1 and a corresponding computer-implemented method. The invention also relates to a computer program and a non-volatile data carrier storing such a computer program.

BACKGROUND

In today's businesses, agriculture, sports and leisure various kinds of positioning systems play an increasingly important role. Naturally, in such systems, high energy efficiency, high accuracy and high capacity are generally desired traits. Nevertheless, it is not a trivial task to optimize the design of a positioning system within a given specification. This is especially the case if the movement patterns of the entities to positioned is unknown beforehand.

WO 2006/022548 describes a system for locating at least one animal in a predetermined area, provided with at least one label which is designed to be attached to or in the at least one animal. The label is provided with a transmitter for transmitting an ultrawide band signal. At least one receiver which is placed in or adjacent the area and is designed to receive the ultra-wide band signal of the transmitter of the at least one label. A signal processing device is connected to or integrated with the at least one receiver for locating the at least one label on the basis of the ultra-wide band signal received by the at least one receiver on the basis of, for instance, delay time and/or reception angle.

Thus, a positioning system, as such, is known where mobile transmitters are used to keep track the individuals of a group of animals. However, even though the ultra-wide radio band in general is relatively spectrum-efficient and provides a high positioning precision, the technology has its limitations, for example with respect to the maximum number of trackable transmitters per unit time and unit area. In areas with crowded zones it may therefore be challenging to arrange the system's receivers/base stations such that an adequate performance is attained over the entire area.

SUMMARY

The object of the present invention is therefore to offer a solution that solves the above problem and provides reliable positioning also in areas that include one or more crowded zones.

According to one aspect of the invention, the object is achieved by a positioning system including a central unit a set of at least three base stations. The central unit is configured to receive identity and timing information; and based thereon determine a respective position in an area of each entity in a set of entities. Each entity carries a respective mobile unit repeatedly transmitting a radio message including the identity information. Each of the base stations is arranged to receive the radio messages from the mobile units in the area; and based thereon, forward the identity and timing information to the central unit via at least one transmission line. During a measurement period, the central unit is configured to register respective positions of the entities in the set of entities in the form of a respective trace for each mobile unit. The central unit is further configured to check if an alarm criterion is fulfilled, which alarm criterion is considered to be fulfilled if, during the measurement period, a first predefined number of the traces are interrupted during a first threshold interval, and the predefined number of traces are interrupted in a first zone of the area, which first zone exceeds a first threshold size. If the alarm criterion is considered to be fulfilled generate a capacity alarm with respect to the first zone. Here, the term "trace" is understood to designate a movement pattern represented by consecutively updates of the entity's position.

This positioning system is advantageous because it automatically identifies hotspots, where the system has inadequate capacity to track the entities. Hence, constructive measures may be taken to compensate for this deficiency, for example by adding and/or relocating at least one base station.

According to one embodiment of this aspect of the invention, the central unit is further configured to indicate a location for a new base station to increase a capacity of the positioning system in the first zone. Here, the location for the new base station is at a geometrical middle point between a first base station and a second base station in the set of base stations, which first and second base stations are located closer to the first zone than any other base station in the set of base stations. Thus, a system designer is straightforwardly guided to a solution of the inferior capacity in the first zone.

According to another embodiment of this aspect of the invention, the central unit is further configured to check if an overcapacity criterion is fulfilled. The overcapacity criterion is considered to be fulfilled if, during the measurement period less than a second predefined number of the traces cross a second zone of the area, and none of the second predefined number of the traces is interrupted in the second zone, which second zone exceeds a second threshold size. If the overcapacity criterion is considered to be fulfilled, the central unit is configured to generate an overcapacity indicator with respect to the second zone. Thereby, any redundant base stations may be removed, or relocated.

According to yet another embodiment of this aspect of the invention, the central unit is further configured to identify one of the base stations in the set of base stations as a candidate base station to be removed from the positioning system. The candidate base station is here a base station in the set of base stations being located closer to the second zone than any other base station in the set of base stations. Thus, the system designer is straightforwardly guided to a solution of the superfluous capacity in the second zone. Consequently, hardware costs may be saved, or the removed base station may be inserted to compensate for any capacity deficit elsewhere in the system.

Preferably, the mobile units in the set of mobile units are configured to transmit the first radio message in the ultra-wide band (UWB). Namely, this frequency band allows for the transmission of a large amount of signal energy without interfering with conventional narrowband and carrier wave transmission in the same frequency band. The UWB offers data communication capability while using extremely little energy and enabling accurate location.

According to still another embodiment of this aspect of the invention, the entities in the set of entities are livestock animals. Namely, for efficiency and health-care reasons, today's farming demands efficient and reliable tracking of all animals at all times.

According to another aspect of the invention, the object is achieved by a computer-implemented positioning method, which is performed in at least one processor. The method involves receiving, via at least one transmission line, identity and timing information from at least three base stations in a set of base stations arranged to receive radio messages from mobile units, each of which is carried by a respective entity in a set of entities and repeatedly transmits a radio message including the identity information. It is presumed that the entities move in an area, and the base stations forward the identity and timing information. The method involves determining, based on the identity and timing information, a respective position in the area of each entity in the set of entities. Moreover, during a measurement period, the method involves registering respective positions of the entities in the set of entities in the form of a respective trace for each mobile unit, and checking if an alarm criterion is fulfilled. The alarm criterion is considered to be fulfilled if, during the measurement period, a first predefined number of the traces are interrupted during a first threshold interval, and the predefined number of traces are interrupted in a first zone of the area, which first zone exceeds a first threshold size. If the alarm criterion is considered to be fulfilled, the method involves generating a capacity alarm with respect to the first zone. The advantages of this method, as well as the preferred embodiments thereof, are apparent from the discussion above with reference to the proposed system.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
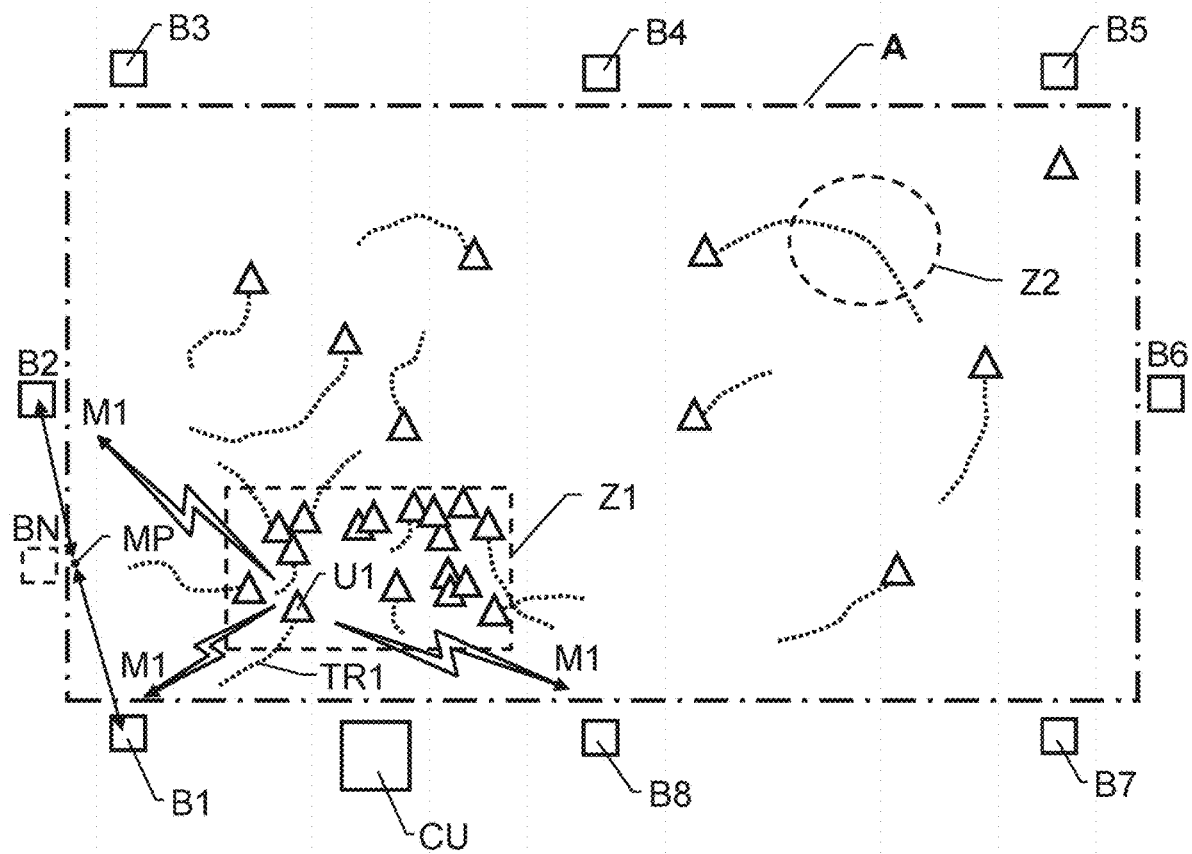
FIG. 1 shows a schematic overview of a positioning system according to one embodiment of the invention.

FIG. 1 shows a schematic overview of the positioning system according to one embodiment of the invention. The positioning system contains a central unit CU and a set of at least three base stations B1, B2, B3, B4, B5, B6, B7 and B8.

The central unit CU is configured to receive identity and timing information; and based thereon determine a respective position in an area A of each entity in a set of entities. Each of the entities carries a respective mobile unit U1 that repeatedly transmits a radio message M1 including the identity information. Technically, of course, the identity information specifies a unique identity of the mobile unit U1 from which the first radio message M1 is transmitted. However, based on an identity conversion table it is trivial to derive a unique entity identity from the mobile unit identity.

Each of the base stations B1, B2, B3, B4, B5, B6, B7 and B8 respectively is arranged to receive the radio messages M1 from the mobile units U1 in the area A. Based thereon, each base station is further configured to forward the identity and timing information to the central unit CU via at least one transmission line.

During a measurement period, the central unit CU is configured to register respective positions of the entities in the set of entities in the form of a respective trace TR1 for each mobile unit U1. In FIG. 1, each mobile unit U1 is represented by a triangle symbol, and the traces are indicated by means of a respective dotted line attached to each triangle symbol.

Figure 2:
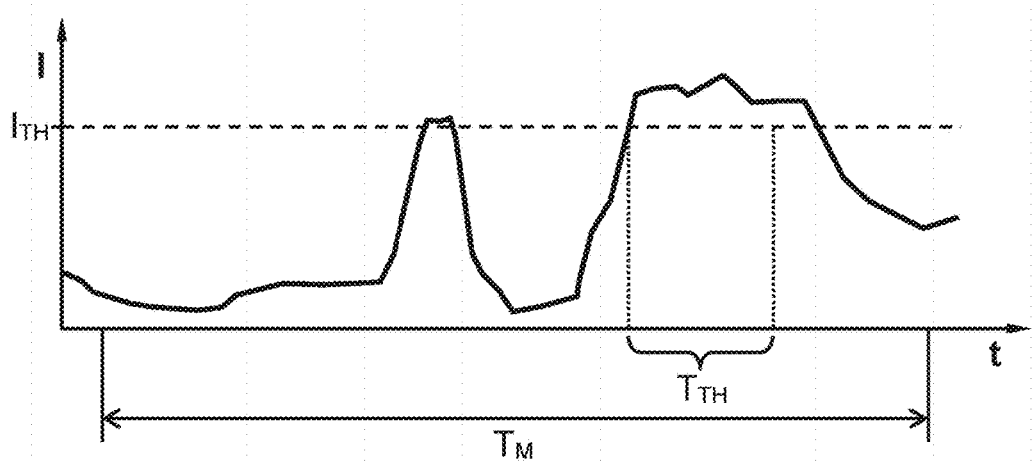
FIG. 2 exemplifies how a number of interrupted entity traces during a measurement period may be used to trigger a capacity alarm according to one embodiment of the invention.

Referring now to FIG. 2, we see a diagram showing time t along the horizontal axis and a number I of interrupted traces TR1 along the vertical axis. FIG. 2 exemplifies one embodiment of the invention according to which the number I of interrupted traces TR1 during the measurement period $T_M$ is used to trigger a capacity alarm.

The central unit CU is configured to check if an alarm criterion is fulfilled. The alarm criterion is considered to be fulfilled if, during the measurement period $T_M$ a first predefined number $I_{TH}$ of the traces TR are interrupted during a first threshold interval $T_{TH}$.

Moreover, to fulfil the alarm criterion, the predefined number $I_{TH}$ of traces TR must be interrupted in a first zone Z1 of the area A, which first zone Z1 exceeds a first threshold size $A_{TH}$. If the alarm criterion is considered to be fulfilled, the central unit CU is configured to generate a capacity alarm CA(Z1) with respect to the first zone Z1.

Figure 3:
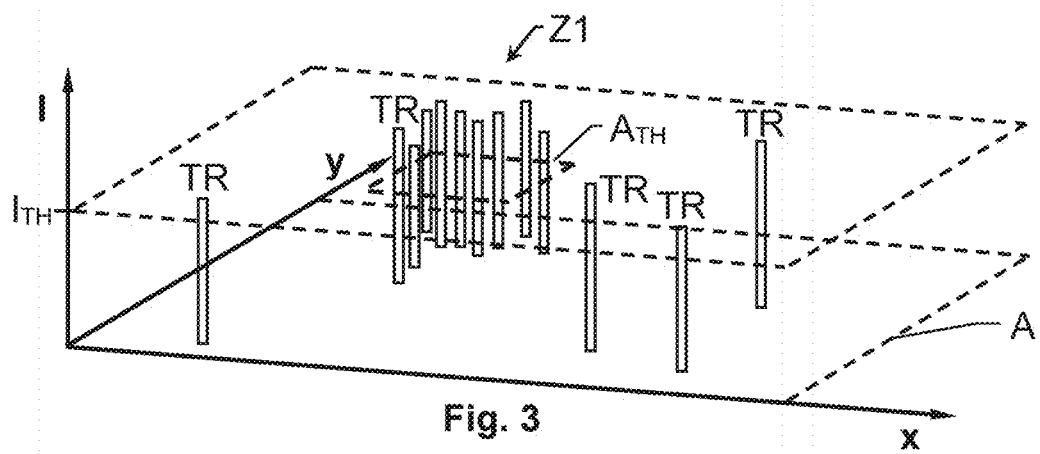
FIG. 3 illustrates how a number of interrupted entity traces per unit area may be used to trigger the capacity alarm according to one embodiment of the invention.

FIG. 3 shows a three-dimensional graph that illustrates, schematically, the number of interrupted traces I along the vertical axis, and the area A along the horizontal plane. Here, at least the first predefined number $I_{TH}$ of the traces TR are interrupted in the first zone Z1 during the measurement period $T_M$. The first zone Z1 also has a size exceeding the first threshold size $A_{TH}$.

In other words, the alarm criterion combines a first condition concerning the number of interrupted traces I with a second condition concerning the size of the zone in which said traces are interrupted. Thus, any hotspots, where the system's has inadequate capacity to track the entities can be identified in a straightforward manner.

According to one embodiment of the invention, the entities in the set of entities are livestock animals. Namely, for efficiency and animal-health reasons, today's farming accurate tracking of each livestock animal at all times. In farm buildings and other areas where large herds are held, it is not uncommon that certain areas become especially crowded, at least periodically. Feeding stations and narrow passages constitute examples of areas where crowding may occur. These places are likewise potential hotspots, i.e. zones in which the positioning system may suffer from insufficient tracking capacity. Typically, this is also where the most accurate tracking is needed. Therefore, the invention is especially useful in connection with positioning livestock animals.

Referring again to FIG. 1, according to one embodiment of the invention, the central unit CU is further configured to indicate a location for a new base station BN to increase a capacity of the positioning system in the first zone Z1. The location is here at a geometrical middle point MP between a first base station B1 and a second base station B2 in the set of base stations, which first and second base stations B1 and B2 respectively are located closer to the first zone Z1 than any other base station in the set of base stations.

Naturally, identifying the above-mentioned hotspots is very important. However, it may also be relevant to identify any base stations that are redundant, i.e. base stations being unnecessary to provide a sufficient tracking capacity.

According to one embodiment of the invention, the central unit CU is therefore further configured to check if an overcapacity criterion is fulfilled. The overcapacity criterion is considered to be fulfilled if, during the measurement period $T_M$ less than a second predefined number of the traces TR1 cross a second zone Z2 of the area A. In order for the overcapacity criterion to be fulfilled, none of the second predefined number of the traces TR1 shall be interrupted in the second zone Z2 either, which second zone exceeds a second threshold size.

If the overcapacity criterion is considered to be fulfilled, the central unit CU is configured to generate an overcapacity indicator OC(Z2) with respect to the second zone Z2.

Figure 4:
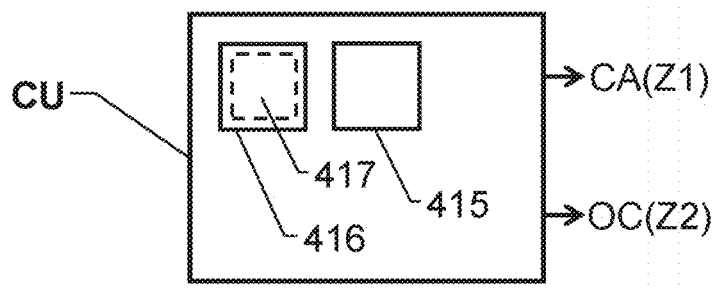
FIG. 4 shows a block diagram of a central unit according to one embodiment of the invention.

FIG. 4 shows a block diagram of the central unit CU according to one embodiment of the invention, where the capacity alarm CA(Z1) and the overcapacity indicator OC(Z2) are presented as output signals.

According to one embodiment of the invention, in response to the overcapacity indicator OC(Z2), the central unit CU is also configured to identify one of the base stations in the set of base stations as a candidate base station to be removed from the positioning system. FIG. 1 exemplifies the base station B5 as such a candidate base station, which candidate base station B5 is a base station in the set of base stations being located closer to the second zone Z2 than any other base station in the set of base stations.

According to one embodiment of the invention, each mobile unit U1 in the set of mobile units is configured to transmit the first radio message M1 to each base station in the set of base stations B1, B2, B3, B4, B5, B6, B7 and B8 respectively in the UWB.

Namely, the UWB allows for the transmission of large amounts of signal energy without interfering with conventional narrowband and carrier wave transmission in the same frequency band. Additionally, the UWB offers data communication capability while using extremely little energy and enabling accurate location.

It is generally advantageous if the central unit CU is configured to effect the above-described procedure in an automatic manner by executing a computer program 417. Therefore, the central unit CU may include a memory unit 416, i.e. non-volatile data carrier, storing the computer program 417, which, in turn, contains software for making processing circuitry in the form of at least one processor 415 in the central unit CU execute the actions mentioned in this disclosure when the computer program 417 is run on the at least one processor 415.

Figure 5:
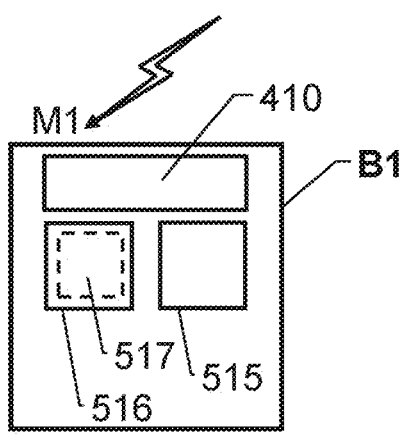
FIG. 5 shows a block diagram of a base station according to one embodiment of the invention.

FIG. 5 shows a block diagram of the base station B1 according to one embodiment of the invention. It is generally advantageous if the base station B1 is configured to effect the above-described procedure in an automatic manner by executing a computer program 517. Therefore, the base station B1 may include a memory unit 516, i.e. non-volatile data carrier, storing the computer program 517, which, in turn, contains software for making processing circuitry in the form of at least one processor 515 in the base station B1 execute the actions mentioned in this disclosure when the computer program 517 is run on the at least one processor 515.

Figure 6:
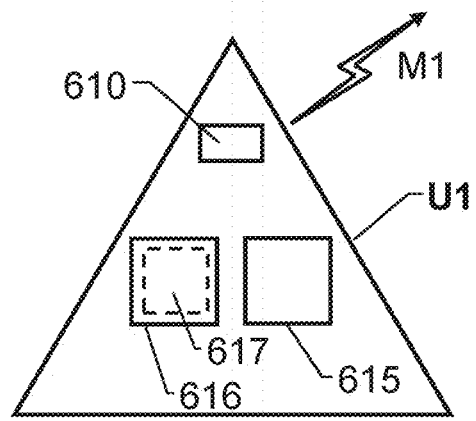
FIG. 6 shows a block diagram of a mobile unit according to one embodiment of the invention.

FIG. 6 shows a block diagram of a mobile unit U1 according to one embodiment of the invention. It is generally advantageous if the mobile unit U1 is configured to effect the above-described procedure in an automatic manner by executing a computer program 617. Therefore, the mobile unit U1 may include a memory unit 616, i.e. non-volatile data carrier, storing the computer program 617, which, in turn, contains software for making processing circuitry in the form of at least one processor 615 in the mobile unit U1 execute the actions mentioned in this disclosure when the computer program 617 is run on the at least one processor 615.

Figure 7:
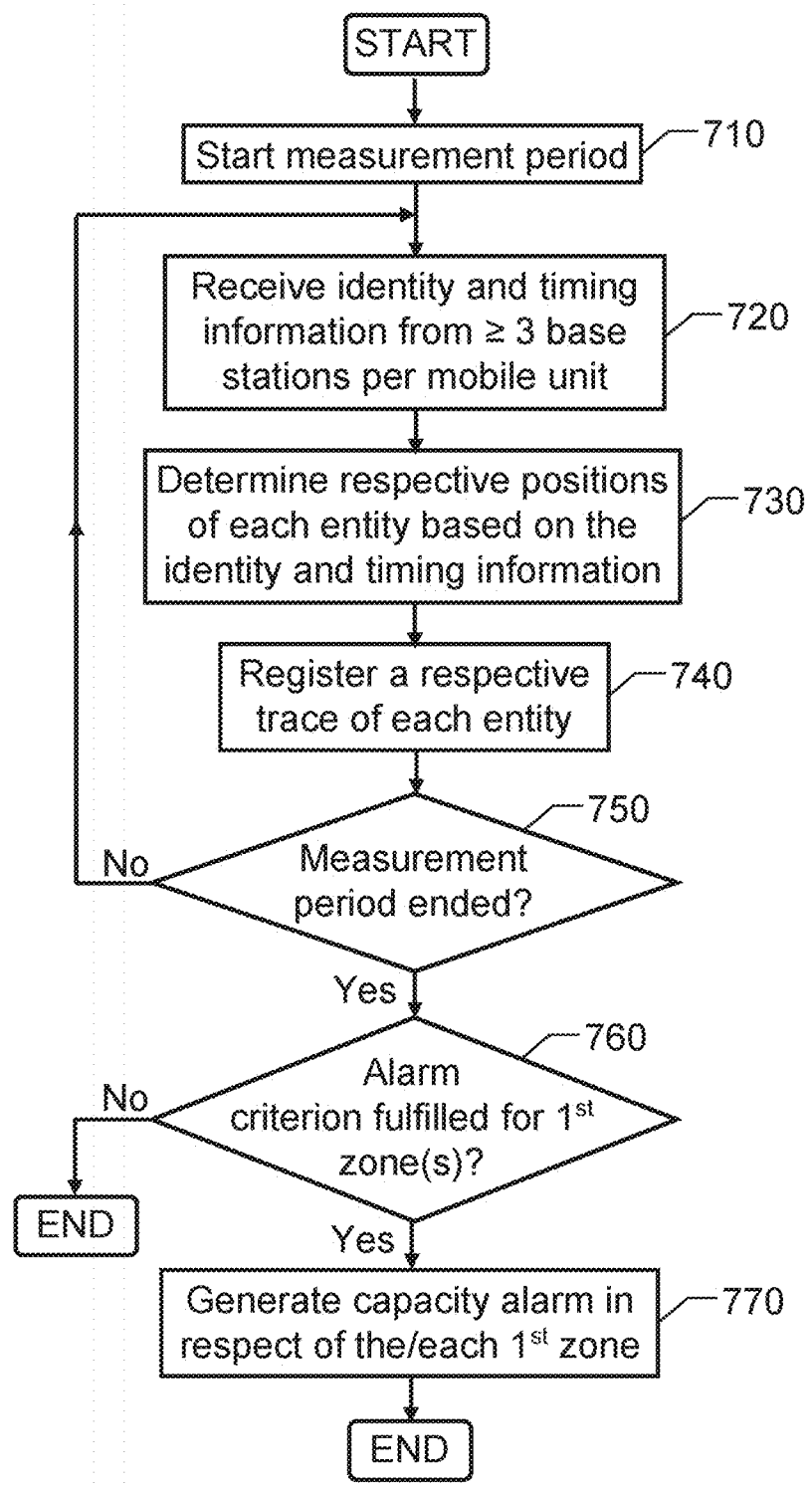
FIG. 7 illustrates, by means of a flow diagram, the general method according to the invention.

In order to sum up, and with reference to the flow diagram in FIG. 7, we will now describe the computer-implemented positioning method according to the invention.

In a first step 710, a measurement period is started.

Then, in a step 720, identity and timing information are received from at least three base stations via at least one transmission line. The base stations, in turn, are arranged to receive radio messages from mobile units, each of which is carried by a respective entity in a set of entities moving in an area and repeatedly transmits a radio message including the identity information.

Thereafter, a step 730 determines a respective position in the area of each entity in the set of entities based on the identity and timing information received in step 720.

Subsequently, step 740 register respective positions of the entities in the set of entities in the form of a respective trace for each mobile unit.

Then, a step 750 tests if the measurement period has ended; and if so, a step 760 follows. Otherwise, the procedure loops back to step 720.

Step 760 checks if an alarm criterion is fulfilled. The alarm criterion is considered to be fulfilled if (i) a first predefined number of the traces are interrupted during a first threshold interval, and (ii) the predefined number of traces are interrupted in at least one first zone of the area, which at least one first zone exceeds a first threshold size.

If the alarm criterion is considered to be fulfilled, a step 770 follows, and otherwise the procedure ends.

In step 770, a capacity alarm is generated with respect to each of the at least one first zone (Z1). Thereafter, the procedure ends.

The process steps described with reference to FIG. 7 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Variations to the disclosed embodiments can be understood and effected by those skilled in the art in practicing the claimed invention, from a study of the drawings, the disclosure, and the appended claims.

The term "comprises/comprising" when used in this specification is taken to specify the presence of stated features, integers, steps or components. The term does not preclude the presence or addition of one or more additional elements, features, integers, steps or components or groups thereof. The indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

It is also to be noted that features from the various embodiments described herein may freely be combined, unless it is explicitly stated that such a combination would be unsuitable.

The invention is not restricted to the described embodiments in the figures, but may be varied freely within the scope of the claims.

The invention claimed is:

1. A positioning system comprising:
   a central unit (CU) configured to receive identity and timing information, and based thereon determine a respective position in an area (A) of each entity in a set of entities, wherein each of the entities carries a respective mobile unit (U1) repeatedly transmitting a radio message (M1) including the identity information; and
   a set of base stations (B1, B2, B3, B4, B5, B6, B7, B8) comprising at least three base stations, each of the base stations being arranged:
      to receive the radio messages (M1) from the mobile units (U1) in the area (A); and based thereon,
      to forward the identity and timing information to the central unit (CU) via at least one transmission line,
   wherein the central unit (CU) is further configured to:
      register, during a measurement period ($T_M$), respective positions of the entities in the set of entities in the form of a respective trace (TR1) for each of the mobile units (U1), wherein each said trace is a movement pattern represented by consecutive updates of a respective said entity's position;
      determine whether an alarm criterion is fulfilled, wherein the alarm criterion is fulfilled if, during the measurement period ($T_M$):
         a first predefined number ($I_{TH}$) of the traces (TR1) are interrupted during a first threshold interval ($T_{TH}$), and
         the predefined number ($I_{TH}$) of the traces (TR1) are interrupted in a first zone (Z1) of the area (A), wherein the first zone exceeds a first threshold size ($A_{TH}$); and
      if the alarm criterion is fulfilled, generate a capacity alarm (CA(Z1)) with respect to the first zone (Z1).

2. The positioning system according to claim 1, wherein the central unit (CU) is further configured to indicate a location for a new said base station (BN) to increase a capacity of the positioning system in the first zone (Z1), wherein the location is at a geometrical middle point (MP) between a first of the base stations (B1) and a second of the base stations (B2) in the set of base stations, the first base station and the second base station (B1, B2) being located closer to the first zone (Z1) than are any other of the base stations in the set of base stations.

3. The positioning system according to claim 2, wherein the central unit (CU) is further configured to:
   determine whether an overcapacity criterion is fulfilled, the overcapacity criterion being fulfilled if, during the measurement period ($T_M$):
      fewer than a second predefined number of the traces (TR1) cross a second zone (Z2) of the area (A), and
      none of the second predefined number of the traces (TR1) is interrupted in the second zone (Z2), wherein the second zone exceeds a second threshold size; and
   if the overcapacity criterion is fulfilled, generate an overcapacity indicator (OC(Z2)) with respect to the second zone (Z2).

4. The positioning system according to claim 3, wherein the central unit (CU) is further configured to identify one of the base stations in the set of base stations (B1, B2, B3, B4, B5, B6, B7, B8) as a candidate base station (B5) to be removed from the positioning system, wherein the candidate base station (B5) is a said base station in the set of base stations that is located closer to the second zone (Z2) than is any other said base station in the set of base stations.

5. The positioning system according to claim 1, wherein each of the mobile units (U1) in the set of mobile units is configured to transmit the radio message (M1) to each of the base stations in the set of base stations (B1, B2, B3, B4, B5, B6, B7, B8) on the ultra-wide band.

6. The positioning system according to claim 1, wherein the entities in the set of entities are livestock animals.

7. A computer-implemented method, performed in at least one processor (615) of a positioning system, the method comprising:
   receiving, via at least one transmission line, identity and timing information from at least three base stations (B1, B2, B3) in a set of base stations arranged to receive radio messages (M1) from mobile units (U1), each of is the mobile units being carried by a respective entity in a set of entities, each of the mobile units repeatedly transmitting a radio message (M1) including the identity information, wherein the entities move in an area (A), and wherein the base stations forward the identity and timing information;

determining, based on the identity and timing information, a respective position in the area (A) of each of the entities in the set of entities;

registering, during a measurement period ($T_M$), respective said positions of the entities in the set of entities in the form of a respective trace (TR1) for each of the mobile units (U1), wherein each said trace is a movement pattern represented by consecutive updates of a respective said entity's position;

determining whether an alarm criterion is fulfilled, wherein the alarm criterion is fulfilled if, during the measurement period ($T_M$):
- a first predefined number ($I_{TH}$) of the traces (TR1) are interrupted during a first threshold interval ($T_{TH}$), and
- the predefined number ($I_{TH}$) of the traces (TR1) are interrupted in a first zone (Z1) of the area (A), wherein the first zone exceeds a first threshold size ($A_{TH}$); and if the alarm criterion is fulfilled, generating a capacity alarm (CA(Z1)) with respect to the first zone (Z1).

8. The method according to claim 7, further comprising: indicating a location for a new said base station (BN) to increase a capacity of the positioning system in the first zone (Z1), wherein the location is at a geometrical middle point (MP) between a first of the base stations (B1) and a second of the base stations (B2) in the set of base stations, the first base station and the second base station (B1, B2) being located closer to the first zone (Z1) than are any other of the base stations in the set of base stations.

9. The method according to claim 8, further comprising: determining whether an overcapacity criterion is fulfilled, the overcapacity criterion being fulfilled if, during the measurement period ($T_M$):
- fewer than a second predefined number of the traces (TR1) cross a second zone (Z2) of the area (A), and
- none of the second predefined number of the traces (TR1) is interrupted in the second zone (Z2), wherein the second zone exceeds a second threshold size; and if the overcapacity criterion is fulfilled, generating an overcapacity indicator (OC(Z2)) with respect to the second zone (Z2).

10. The method according to claim 9, further comprising: identifying one of the base stations in the set of base stations (B1, B2, B3, B4, B5, B6, B7, B8) as a candidate base station (B5) to be removed from the positioning system, wherein the candidate base station (B5) is a said base station in the set of base stations that is located closer to the second zone (Z2) than is any other said base station in the set of base stations.

11. The method according to claim 7, further comprising: transmitting the radio message (M1) from each of the mobile units (U1) in the set of mobile units to each said base station in the set of base stations (B1, B2, B3, B4, B5, B6, B7, B8) on the ultra-wide band.

12. The method according to claim 7, wherein the entities in the set of entities are livestock animals.

13. A non-volatile data carrier readable by a processing unit and having recorded thereon a computer program (417, 517, 617) comprising software configured to execute the method according to claim 7 when the computer program (417, 517, 617) is run on the processing unit (415, 515, 615).

\* \* \* \* \*